United States Patent
Tujkovic et al.

(10) Patent No.: US 6,934,320 B2
(45) Date of Patent: Aug. 23, 2005

(54) ORTHOGONALIZED SPATIAL MULTIPLEXING FOR WIRELESS COMMUNICATION

(75) Inventors: Djordje Tujkovic, Oulu (FI); Emiliano Sottani, Castelfranco di Sopra (IT)

(73) Assignee: Nokia Corporation, Espoo (FI)

( * ) Notice: Subject to any disclaimer, the term of this patent is extended or adjusted under 35 U.S.C. 154(b) by 447 days.

(21) Appl. No.: 10/127,327

(22) Filed: Apr. 19, 2002

(65) Prior Publication Data

US 2003/0198282 A1 Oct. 23, 2003

(51) Int. Cl.[7] .............................. H04B 1/707; H04B 7/02
(52) U.S. Cl. ...................... 375/146; 375/267; 375/299
(58) Field of Search ................................ 375/140, 141, 375/146, 260, 267, 299

(56) References Cited

U.S. PATENT DOCUMENTS

| | | | |
|---|---|---|---|
| 5,467,367 A | * 11/1995 | Izumi et al. ................ | 375/142 |
| 6,128,330 A | * 10/2000 | Schilling .................... | 375/141 |
| 2003/0048857 A1 | * 3/2003 | Onggosanusi et al. ...... | 375/267 |

OTHER PUBLICATIONS

3G TR25.848 V0.6.0 (May, 2000); "3rd Generation Partnership Project, Technical Specification Group Radio Access Network; Physical Layer Aspects of UTRA High Speed Downlink Packet Access".

"Combined Array Processing and Space–Time Coding"; Tarokh et al.; IEEE Trans Inf. Th. vol. 45, No. 4, May 1999.

"Space–Time Coding and Transmission Optimization for Wireless Channels"; A. Tehrani et al.; IEEE, 0–7803–5148, pp. 1798–1802, Jul. 1998.

"Space–Time Autocoding"; B. Hochwald et al.; Bell Labs Technical Memorandum, 1999. Submitted to IEEE Transactions on Information Theory.

* cited by examiner

*Primary Examiner*—Khai Tran
*Assistant Examiner*—David B. Lugo
(74) *Attorney, Agent, or Firm*—Ware, Fressola, Van Der Sluys & Adolphson LLP (57) ABSTRACT

A method and system for processing information data in a wireless communications system for reducing the complexity in spatial multiplexing of signals over different transmit antennas. In orthogonalized spatial multiplexing with the resolution of one, encoded data are interleaved and converted into a plurality of parallel sub-streams. Each sub-stream is then spreaded with a user specific spreading code with an intentional delay offset of few chips prior to modulating the encoded data for transmission. Likewise, in orthogonalized spatial multiplexing with the resolution of two, encoded data are interleaved and converted into a plurality of parallel sub-stream pairs. Each sub-stream pair is spreaded pairwise with a user specific spreading code with an intentional delay offset of few chips.

5 Claims, 11 Drawing Sheets

ORTHOGONALIZED SPATIAL MULTIPLEXING FOR WIRELESS COMMUNICATION

FILED OF THE INVENTION

The present invention relates generally to a spatial multiplexing system and, more particularly, to MIMO high speed downlink WCDMA FDD.

BACKGROUND OF THE INVENTION

The demand and growth of wireless communication services requires reliable and fast transmission of data and video with data rates of several Megabits per second. The fundamental phenomenon that makes reliable wireless transmission difficult is the time-varying multi-path fading, with the rates depending on the mobility of the user. Sending multiple copies of the same transmitted signal through possibly independent fading channels increases the probability that at least one of them will arrive at the receiver without being severely deteriorated. This technique is called diversity. It presents the single most important and well-established solution for the reliable wireless communication. Different diversity methods such as temporal, frequency, polarization or spatial diversity are successfully employed in the existing wireless communication system.

Wideband CDMA (code division multiple access) types of systems occupy a bandwidth typically several times larger than the channel's coherence bandwidth. Multi-path combining at the receiver turns the frequency diversity of the channel into an inherent benefit of the system. However, indoor wireless channels have large coherence bandwidths and, therefore, usually offer no frequency diversity. In order to circumvent this coherent bandwidth problem, it is possible to assign the same copy of transmitted signal to different uncorrelated transmit antennas and spreading each of the assigned copies with a different delayed version of the same spreading code, wherein each version is offset by a few chips. This method, known as the CDMA Delay Transmit Diversity scheme, creates artificial multi-path propagation and transforms a frequency non-selective channel into a frequency-selective channel.

Recent theoretical results in information theory have shown that multiple-input multiple-output (MIMO) wireless channels potentially offer a linear increase in link capacity, providing that antennas at the transmitter and receiver arrays are uncorrelated and that ubiquitous "key hold" effects do not occur in the channel. Multiple antenna systems with the corresponding signal design (coding and modulation) are, therefore, seen as a key solution for high demand on transmission speed and reliability in future wireless systems. When the channel state information (CSI) is not available at a transmitter, space-time coding (STC) is an optimal signaling strategy, designed to reach the theoretical limits on MIMO Rayleigh fading channel capacity by simultaneously coding across the spatial domain and the temporal domain. However, the complexity of the STC increases exponentially with the number of transmit antennas. In a theoretically optimal STC system, the complexity would reach the point when maximum likelihood decoding (MLD) becomes impractical or even unrealizable.

Lower complexity sub-optimal schemes based on the combining of classical single antenna channel coding with MIMO signal processing have recently gained a huge interest. Current 3GPP standardization for high speed down-link WCDMA FDD, as disclosed in "$3^{rd}$ Generation Partnership Project, Technical Specification Group Radio Access Network; Physical Layer Aspects of UTRA High Speed Downlink Packet Access" (3G TR25.848, v4.0.0 (2001–03)), is mainly concentrated around two proposals for multiple antenna transmission, VBLAST (Vertical Bell Labs Space-Time) and the tradeoff between rate, puncturing and orthogonality in space-time block codes for more than two transmit antennas.

VBLAST relies on spatial multiplexing at transmitter and spatial filtering at receiver, to enable employment of single antenna channel codes to MIMO systems. Detection is performed by successive nulling of layers, which are not yet detected, combined with decision-directed interference suppression of those layers previously detected. Spatial filtering at receiver requires the number of receive antennas to be greater than or equal to the number of transmit antennas, which might be impractical for down-link type of systems. Due to linear processing used to suppress interfering signals, dominant diversity in this architecture is one. Applying powerful channel coding with iterative turbo detection (inter-antenna interference suppression) and decoding was also considered as a way to improve the performance, but the drawback of such approach is a further dramatic increase in receiver complexity.

A generalization of VBLAST, as introduced in Tarokh et al. "Combined Array Processing and Space-Time Coding" (IEEE Trans Inf. Th. vol. 45, no. May 4, 1999), proposes the application of lower complexity two antenna space-time trellis codes to more than two transmit antennas. Antennas at transmitter are partitioned into pairs, and individual space-time trellis codes (STTC) (component codes) are used to transmit information from each pair of transmit antennas. More powerful space-time codes for two transmit antennas, i.e., space-time turbo coded modulation (STTuCM) can be readily applied as component codes. At the receiver, an individual space-time code is decoded with the help of a liner array processing (LAP) technique called, "the group interference suppression method", that suppresses signals transmitted by other pairs of transmit antennas treating them as interference. The above method enables the number of receive antennas to be reduced by half as compared to VBLAST. Similar to VBLAST, the performance can be further improved by iterative, inter-antenna interference suppression and decoding with the prize of increased system complexity.

Single antenna channel codes and space-time codes applied to VBLAST and its generalization can be employed as a horizontally- or vertically-coded system with, the difference coming from position of the block for serial-to-parallel conversion before or after the encoding block, respectively. A horizontally-coded system will enable improved decoded-based, decision-directed interference suppression, and the vertically-coded system is expected to benefit from averaged SNR (signal-to-noise ratio) over successive layers, i.e., spatial interleaving.

Space-time block codes (STBC) were originally introduced as a simple transmit-diversity scheme (STTD) for power efficiency improvement by employing two antennas at the transmitter. STTD was later generalized to an arbitrary number of transmit antennas, though the schemes for more than two transmit antennas have a drawback of decreased rate as compared to single transmit antenna systems. The main benefit of space-time block codes is a simple yet efficient exploitation of transmit antenna diversity, but even if some optimality is compromised for retrieved rate, the overall throughput is no higher than in single transmit antenna systems.

The spatial multiplexing of signals over different transmit antennas employed in VBLAST and its generalization assumed separation of transmitted signals only at receiver. Being spreaded by the same spreading code and simultaneously transmitted over n different transmit antennas, signals arriving at the given receive antenna destructively interfere each other. To detect the signal coming from the first transmit antenna, i.e., the first layer, n−1 interfering signals are nulled out by a linear ZF (zero-forcing) or MMSE (minimum mean square error) based spatial filtering method that requires a minimum of n antennas at the receiver. After the first layer has been detected, its contribution to the received signals on different receive antennas is subtracted and detection of the next layer is performed in the same fashion. The above method increases the complexity of the mobile handset in the downlink and has obvious limitations in the throughput determined by the minimum required number of antennas in the receiver. Due to the linear processing at the receiver, the dominant diversity in the system is one.

It is advantageous and desirable to provide a method and system for spatial multiplexing of signals over different transmit antennas wherein the complexity can be reduced so that the method and system can be used in a mobile handset.

SUMMARY OF THE INVENTION

It is a primary object of the present invention to reduce the complexity in spatial multiplexing of signals over different transmit antennas in a wireless communications system, wherein encoded data are spreaded prior to the modulation of encoded data for transmission. This object can be achieved by interleaving and separating the encoded data into data sub-streams prior to the spreading of the encoded data.

Thus, according to the first aspect of the present invention, there is provided a method (300) of processing information data (110) in a wireless communications system (1, 5) having a plurality of transmit antennas $(22_1, \ldots, 22_n)$ for transmission, wherein the method comprises the steps of:

encoding (312) the information data for providing encoded data (112, 213);

spreading (318) the encoded data (112, 213) with a spreading code $(180_0)$ for providing a first spreaded data stream $(118_1, 218_1, 218_2)$;

spreading (318) the encoded data with at least one delayed version $(180_1, \ldots, 180_{n-1})$ of the spreading code $(180_0)$ for providing at least one second spreaded data stream $(118_2, 218_3, 218_4)$;

modulating (320) the first and second spreading-coded data streams for providing modulated signals $(120_1, \ldots, 120_n, 220_1, \ldots, 220_n)$; and conveying the modulated signals $(120_1, \ldots, 120_n, 220_1, \ldots, 220_n)$ to the transmit antennas $(22_1, \ldots 22_n)$ for transmission. The method is characterized by separating (316) the encoded data (112, 213) into data sub-streams $(116_1, \ldots, 116_n, 217_1, \ldots, 217_n)$ prior to said spreading (318), the data sub-streams including at least a first group of encoded data $(116_1, 217_1, 217_2)$ and a second group of encoded data $(116_2, 217_3, 217_4)$ such that the first spreaded data stream $(118_1, 218_1, 218_2)$ is indicative of the first group of encoded data $(116_1, 217_1, 217_2)$ and said at least one second spreaded data stream $(118_2, 218_3, 218_4)$ is indicative of the second group of encoded data $(116_2, 217_3, 217_4)$.

According to the present invention, the method is further characterized by interleaving (314) the encoded data (112, 213) prior to said separating (316) such that the first group and second group of encoded data $(116_1, 217_1, 217_2)$ $(116_2, 217_3, 217_4)$ are separated according to said interleaving (314).

Advantageously, the encoded data (213) comprises a pair of mutually orthogonal substream symbols $(213_1, 213_2)$ and the method is further characterized in that the data sub-streams $(217_1, \ldots, 217_n)$ comprise at least a first pairwise substream $(217_1, 217_2)$ and a second pairwise substream $(217_3, 217_4)$ of the substream symbol pair $(213_1, 213_2)$, such that the first group of encoded data comprises the first pairwise substream $(217_1, 217_2)$ and the second group of encoded data comprises the second pairwise substream $(217_3, 217_4)$.

Advantageously, the encoded data (213) comprises a group of N mutually orthogonal substream symbols $(213_1, \ldots, 213_N)$, with N being a positive integer greater than 2, and the method is further characterized in that the data sub-streams $(217_1, \ldots, 217_n)$ comprise at least a first group of N substreams and a second group of N substreams of the substream symbols, such that the first group of encoded data comprises the first group of N substreams $(217_1, 217_2)$ and the second group of encoded data comprises the second group of N substreams $(217_3, 217_4)$.

According to the second aspect of the present invention, there is provided a transmitter (1, 5) for processing information data (110) for providing modulated signals $(120_1, \ldots, 120_n, 220_1, \ldots, 220_n)$ for transmission via a plurality of transmit antennas $(22_1, \ldots, 22_n)$, wherein the transmitter (1, 5) comprises:

means (12, 13), responsive to the information data (110), for providing encoded data (112, 213);

means (18) for spreading the encoded data with a spreading code $(180_0)$ for providing a first spreaded data stream $(118_1, 218_1, 218_2)$, and for spreading the encoded data with at least one delayed version $(180_1, \ldots, 180_{n-1})$ of the spreading code $(180_0)$ for providing at least one second spreaded data stream $(118_2, 218_3, 218_4)$; and means (20) for modulating the first and second spreaded data streams for providing the modulated signals. The transmitter is characterized by means (16, 17), responsive to the encoded data (112, 213), for separating the encoded data into data sub-streams $(116_1, \ldots, 116_n, 217_1, \ldots, 217_n)$ prior to the spreading of the encoded data by the spreading means (18), the data sub-streams including at least a first group of encoded data $(116_1, 217_1, 217_2)$ and a second group of encoded data $(116_2, 217_3, 217_4)$ such that the first spreaded data stream $(118_1, 218_1, 218_2)$ is indicative of the first group of encoded data $(116_1, 217_1, 217_2)$ and said at least one second spreaded data stream $(118_2, 218_3, 218_4)$ is indicative of the second group of encoded data $(116_2, 217_3, 217_4)$.

According to the present invention, the transmitter is further characterized by means (14, 15), responsive to the encoded data (112, 213) for interleaving the encoded data (112, 213) prior to the separation of the encoded data by the separating means (16, 17) such that the first group and second group of encoded data $(116_1, 217_1, 217_2)$ $(116_2, 217_3, 217_4)$ are separated according to said interleaving (314).

Advantageously, the encoded data (213) comprises a pair of mutually orthogonal substream symbols $(213_1, 213_2)$ and the transmitter is further characterized in that the data sub-streams ($217_1, \ldots, 217_n$) comprise at least a first pairwise substream ($217_1, 217_2$) and a second pairwise substream ($217_3, 217_4$) of the substream symbol pair ($213_1, 213_2$), such that the first group of encoded data comprises the first pairwise substream ($217_1, 217_2$) and the second group of encoded data comprises the second pairwise substream ($217_3, 217_4$).

According to the third aspect of the present invention, there is provided a wireless communications system (1, 3) (5, 7) comprising a transmitter (1, 5) and a receiver (3, 7), the transmitter (1, 5) having a plurality of transmit antennas ($22_1, \ldots, 22_n$) for transmitting modulated signals ($120_1, \ldots, 120_n, 220_1, \ldots, 220_n$) indicative of information data (110) and the receiver (3, 7) having a plurality of receive antennas antennas ($30_1, \ldots 30_m$) for receiving modulated signals, wherein the transmitter (1, 5) comprises:

means (12, 13), responsive to the information data (110), for providing encoded data (112, 213);

means (18) for spreading the encoded data with a spreading code ($180_0$) for providing a first spreaded data stream ($118_1, 218_1, 218_2$), and for spreading the encoded data with at least one delayed version ($180_1, \ldots, 180_{n-1}$) of the spreading code ($180_0$) for providing at least one second spreaded data stream ($118_2, 218_3, 218_4$); and means (20) for modulating the first and second spreaded data streams for providing the modulated signals. The communications system is characterized by means (16, 17), responsive to the encoded data (112, 213), for separating the encoded data into data sub-streams ($116_1, \ldots, 116_n, 217_1, \ldots, 217_n$) prior to the spreading of the encoded data by the spreading means (18), the data sub-streams including at least a first group of encoded data ($116_1, 217_1, 217_2$) and a second group of encoded data ($116_2, 217_3, 217_4$) such that the first spreaded data stream ($118_1, 218_1, 218_2$) is indicative of the first group of encoded data ($116_1, 217_1, 217_2$) and said at least one second spreaded data stream ($118_2, 218_3, 218_4$) is indicative of the second group of encoded data ($116_2, 217_3, 217_4$).

According to the present invention, the communications system is further characterized in that the transmitter (1, 5) further comprises means (14, 15), responsive to the encoded data (112, 213) for interleaving the encoded data (112, 213) prior to the separation of the encoded data by the separating means (16, 17) such that the first group and second group of encoded data ($116_1, 217_1, 217_2$) ($116_2, 217_3, 217_4$) are separated according to said interleaving (314).

Advantageously, the encoded data (213) comprises a pair of mutually orthogonal substream symbols ($213_1, 213_2$) and the communications system is further characterized in that the data sub-streams ($217_1, \ldots, 217_n$) comprise at least a first pairwise substream ($217_1, 217_2$) and a second pairwise substream ($217_3, 217_4$) of the substream symbol pair ($213_1, 213_2$), such that the first group of encoded data comprises the first pairwise substreams ($217_1, 217_2$) and the second group of encoded data comprises the second pairwise substreams ($217_3, 217_4$).

The present invention will become apparent upon reading the description taken in conjunction with FIGS. 1 to 5.

BEST MODE TO CARRY OUT THE INVENTION

The present invention makes use of the good autocorrelation properties of the spreading codes to separate or orthogonalize spatially multiplexed signals at the transmitter. Delayed versions of the same spreading code are applied to different individual or groups of transmit antennas, depending on the resolution of one or two for the orthogonalized spatial multiplexing (OSM) method. The method, according to the present invention, preserves the allocated number of spreading codes and enables a simple detection with just the use of matched filtering, i.e., RAKE receiver. Since the signals are separated already at the transmitter, there are no restrictions in the terms of the minimum required number of receiver antennas. The diversity level of the system is equal to the number of employed receive antennas. As we will show, the number of antennas at the receiver is determined by the level of interference in the system and the desired system performance and is typically lower than in VBLAST.

Orthogonalized Spatial Multiplexing with the Resolution of One (OSM-1)

Figure 1:
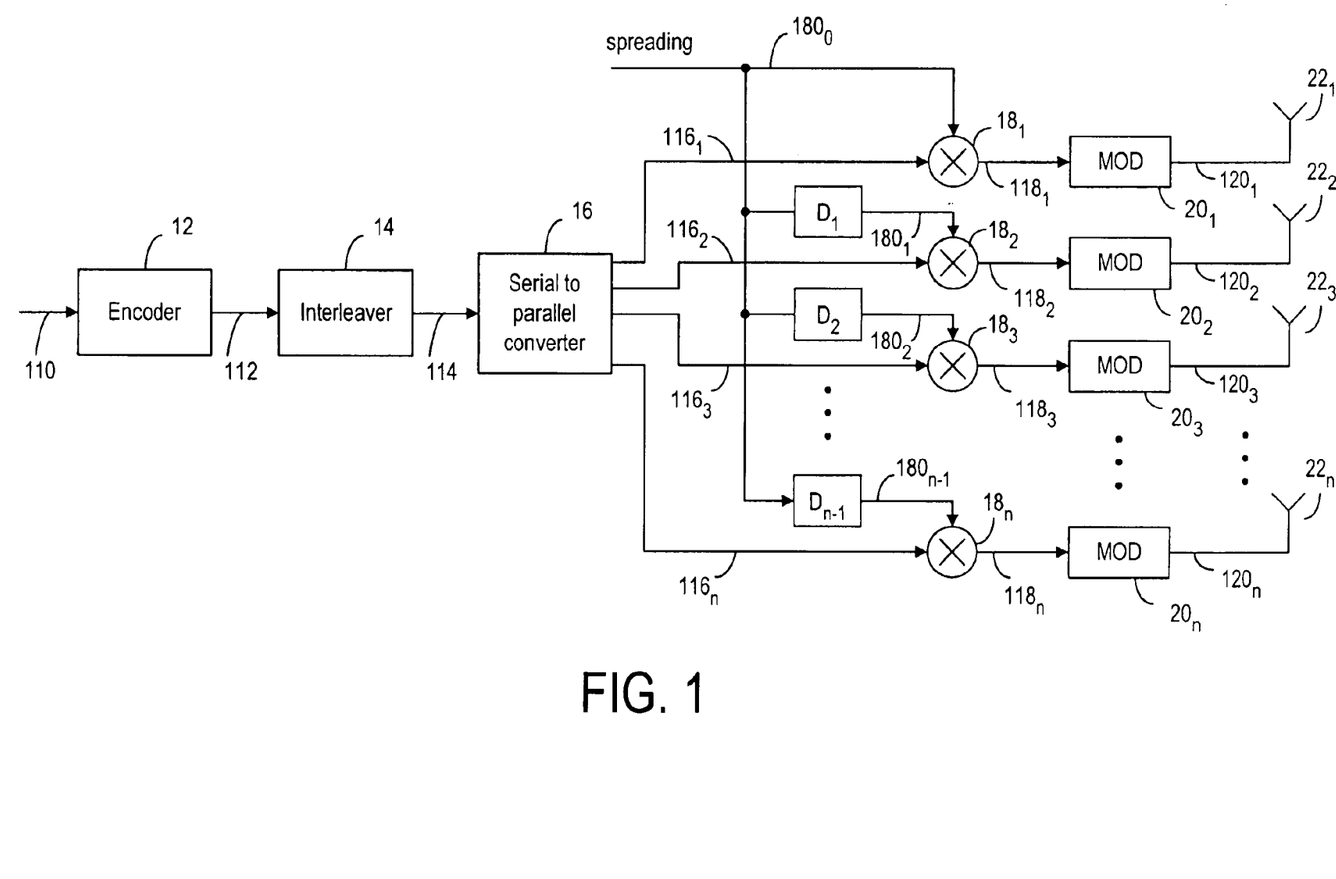
FIG. 1 is a block diagram illustrating the transmitter, according to the OSM-1 method of the present invention.
Figure 2:
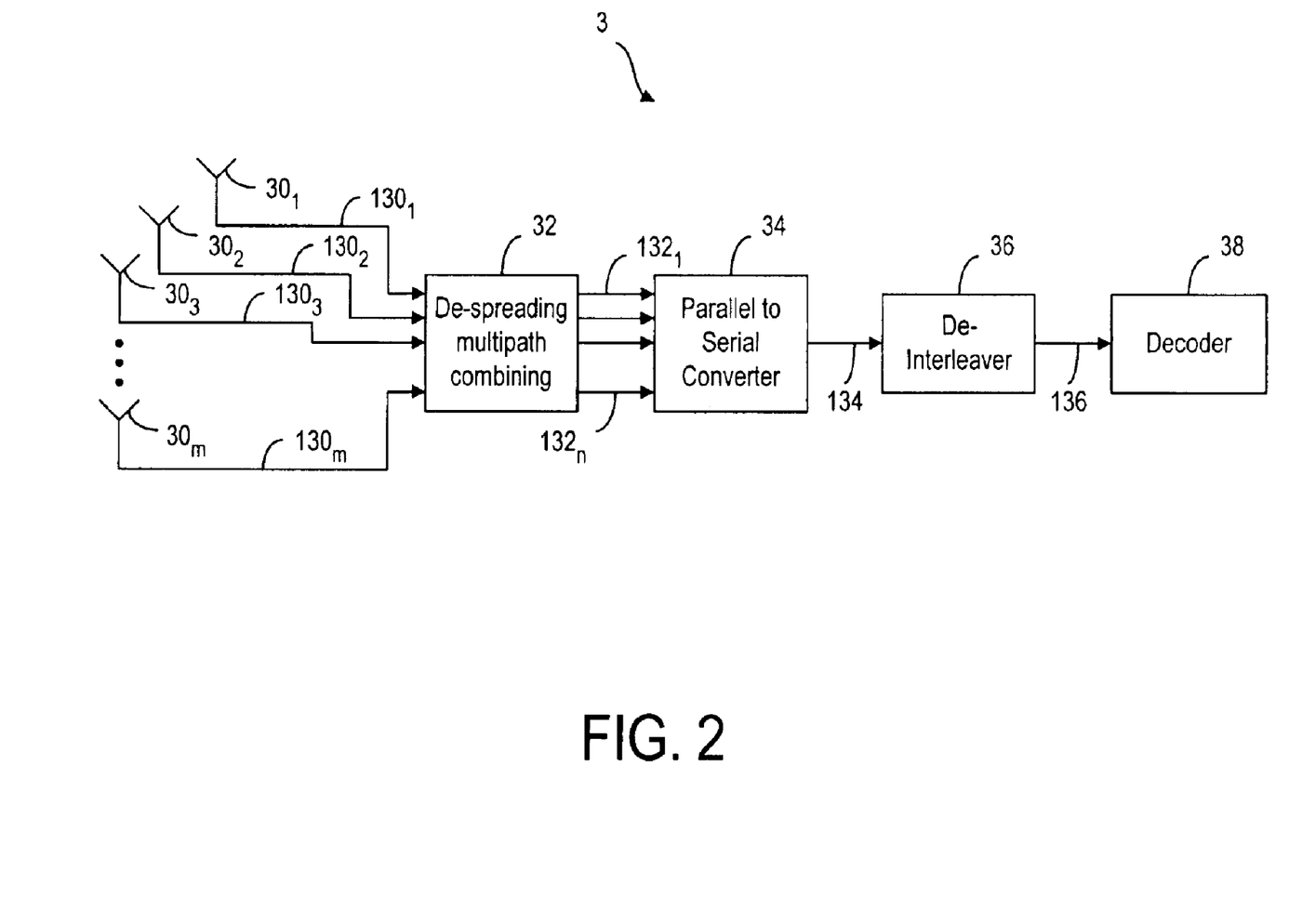
FIG. 2 is a block diagram illustrating the receiver, according to the OSM-1 method of the present invention.
Figure 3:
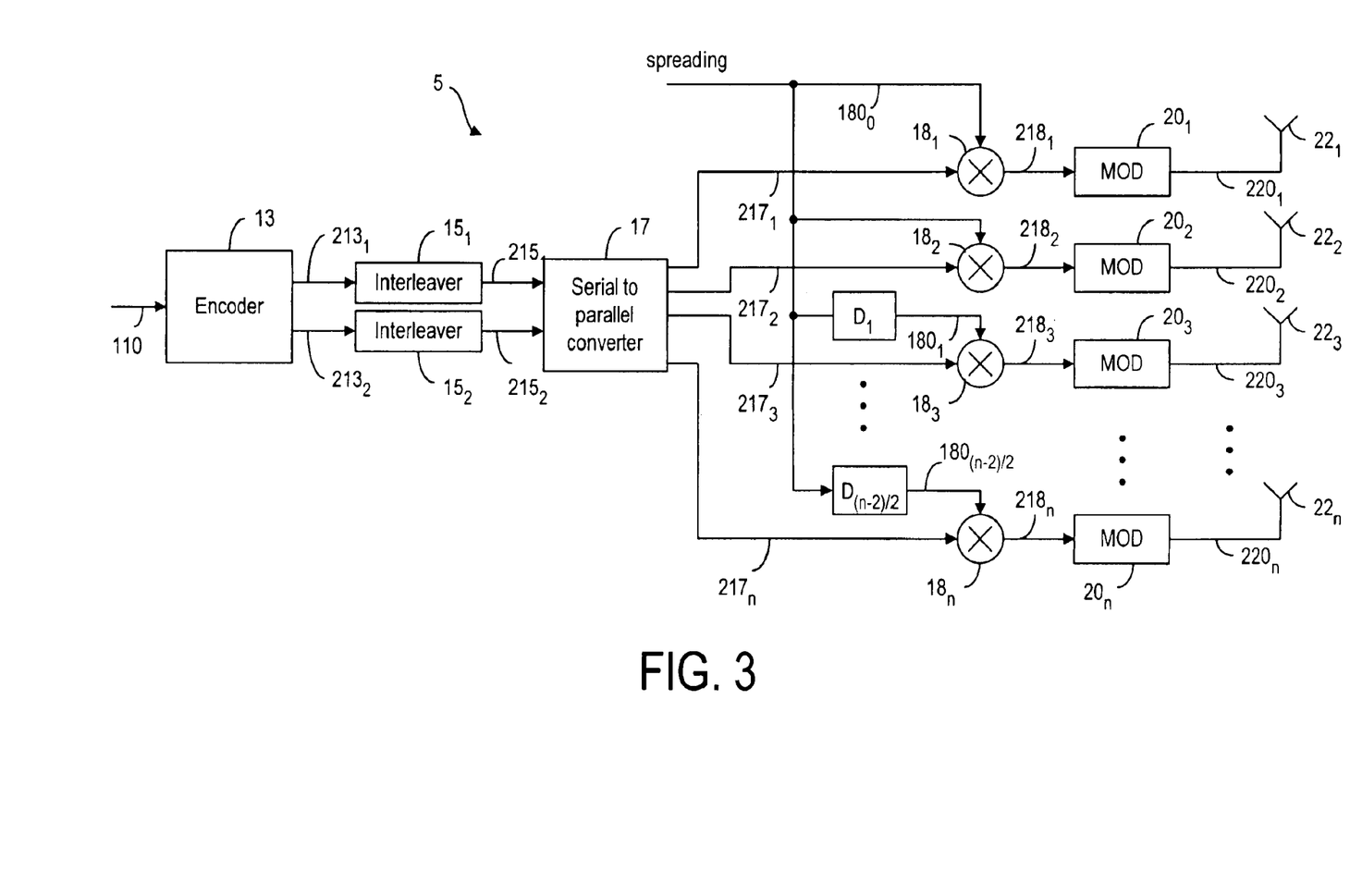
FIG. 3 is a block diagram illustrating the transmitter, according to the OSM-2 method of the present invention.
Figure 4:
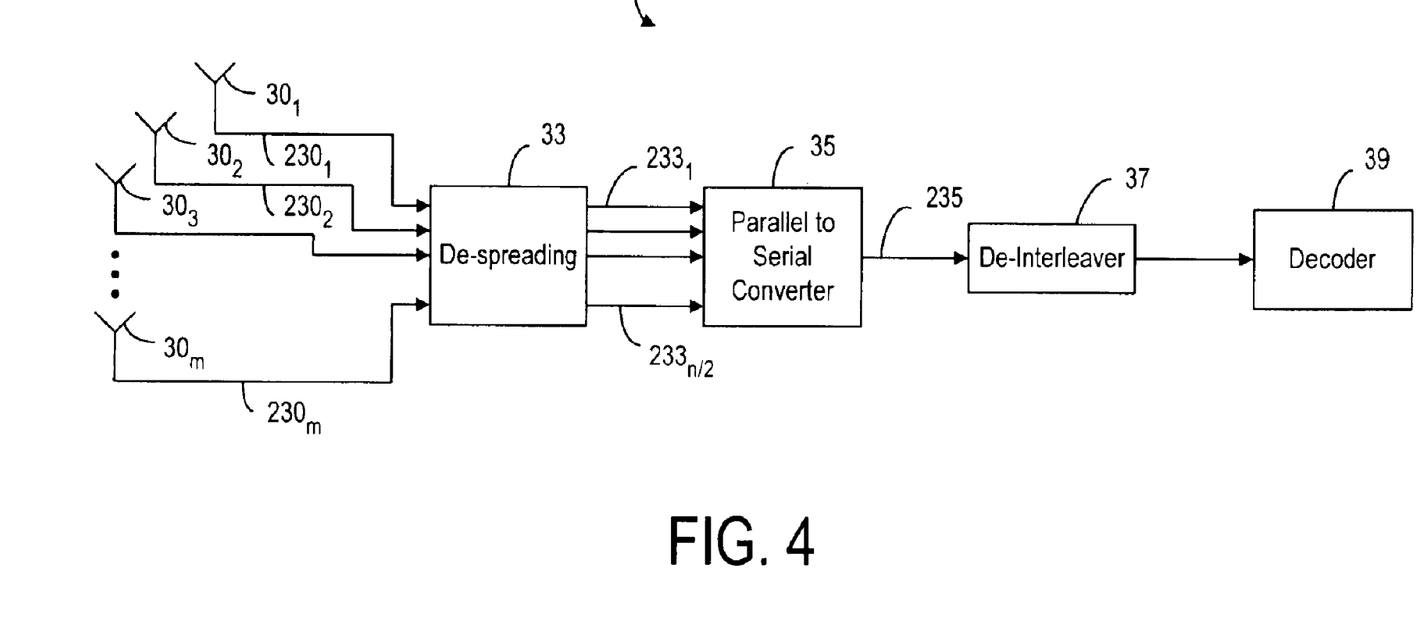
FIG. 4 is a block diagram illustrating the receiver, according to the OSM-2 method of the present invention.

Block diagrams of a transmitter 1 and a receiver 3 for the OSM with the resolution of one are depicted in FIG. 1 and FIG. 2, respectively. A transmitter 5 and a receiver 7 for the OSM with the resolution of two are depicted in FIG. 3 and FIG. 4, respectively. As shown in FIG. 1, input information data 110 is encoded by a single antenna channel encoder 12. Binary outputs 112 of the encoder 12 are interleaved by an interleaver 14. The interleaved data stream 114 is converted by the serial-to-parallel converter 16 into n parallel substreams $116_1, 116_2, \ldots, 116_n$. Each substream is spreaded by means of a mixer with a user specific spreading code 180 with a substream-specific intentional delay offset $D_k$ of few chips. The delayed versions of the spreading code are denoted by $180_0, 180_1, \ldots, 180_{n-1}$, wherein $180_k$ is the spreading code delayed by a delay offset $D_k$ and is used to spread the substream $116_{k+1}$ by means of the mixer $18_{k+1}$. After spreading, signals $118_1, 118_2, \ldots, 118_n$, from different substreams are modulated by modulators $20_1, \ldots, 20_n$. The modulated signals $120_1, \ldots, 120_n$ are transmitted simultaneously over n transmit antennas $22_1, \ldots, 22_n$.

As shown in FIG. 2, received signal $130_m$ at each receive antenna $30_m$ is demodulated and de-spreaded by a module 32. The received signal from each receive antenna is indicative of all of the substreams $116_1, 116_2, \ldots, 116_n$. Accordingly, a RAKE receiver (not shown) with n×L RAKE fingers synchronized to the substream-specific, intentionally-introduced delays $D_1, \ldots, D_{n-1}$ and the corresponding multipaths of the estimated power delay profile of the channel is used to process the received signal from each receive antenna. L is the number of resolvable multi-paths in the channel. As such, necessary detection statistics for each substream are collected by maximum ratio combining (MRC) of RAKE finger ouputs from different receive antennas and multipaths. Substream soft estimates $132_1, \ldots, 132_n$ are then converted by a parallel-to-serial converter 34. The combined signals 134 are then de-interleaved by a de-interleaver 36. The resulting data stream 136 is then decoded by a channel decoder 38.

Orthogonalized Spatial Multiplexing with the Resolution of Two (OSM-2)

The OSM-1 scheme, as discussed in conjunction with FIGS. 1 and 2, can be generalized to OSM-2. As shown in FIG. 3, information data stream 110 is first encoded by the space-time code (STC) encoder 13 for two transmit antennas, which produces a pair of complex modulated substream symbols $213_1, 213_2$. The STC can be either Space-Time Trellis Code (STTC), Space-Time Turbo Coded Modulation (STTuCM) or Space-Time Block Code (STBC). Substream symbols $213_1, 213_2$ are then interleaved pairwise on the symbol level by two interleavers $15_1, 15_2$ and converted with the pairwise serial-to-parallel converter 17 into n/2 pairs of substreams $(217_1, 217_2), (217_3, 217_4), \ldots, (217_{n-1}, 217_n)$. Each pair of substreams is then spreaded via a mixer using a user specific spreading code 180 with a substream-pair, specific intentional delay offset $D_j$ of few chips. The delayed versions of the spreading code are denoted by $180_0, 180_1, \ldots$, wherein $180_j$ is the spreading code delayed by an delay offset $D_j$ and is used to spread the substream $271_{2j+1}$ via the mixer $182_{2j+1}$ and the substream $217_{2j+2}$ via the mixer $18_{2j+2}$. After spreading, signal pairs $(218_1, 218_2), \ldots (218_{n-1}, 218_n)$ from different substream pairs are modulated by modulators $20_1, \ldots, 20_n$. The modulated signals $220_1, \ldots, 220_n$ are transmitted simultaneously over n transmit antennas $22_1, \ldots, 22^n$.

As shown in FIG. 4, received signals $230_m$ at each receive antenna $30_m$ are demodulated and de-spreaded by a module 33. The received signal from each receive antenna is indicative of all of the substream pairs $(217_1, 217_2), \ldots, (217_{n-1}, 217_n)$. Accordingly, a RAKE receiver (not shown) with n/2×L RAKE fingers synchronized to the substream-pair specific intentionally introduced delays $D_1, \ldots, D_j$, where j is equal to (n−2)/2, and the corresponding multipaths of the estimated power delay profile of the channel is used to process the received signal from each receive antenna. Despreaded outputs from different receive antennas and multipaths related to certain substream-pairs are then collected without any combining. Collected substream-pair soft outputs $233_1, 233_2, \ldots, 233_{n/2}$ are converted with a parallel-to-serial converter 35, deinterleaved by a de-interleaver 37, and passed to an STC decoder 39 where, with the knowledge of the channel state information (CSI), combining is carried out within the decoder metric.

Figure 5:
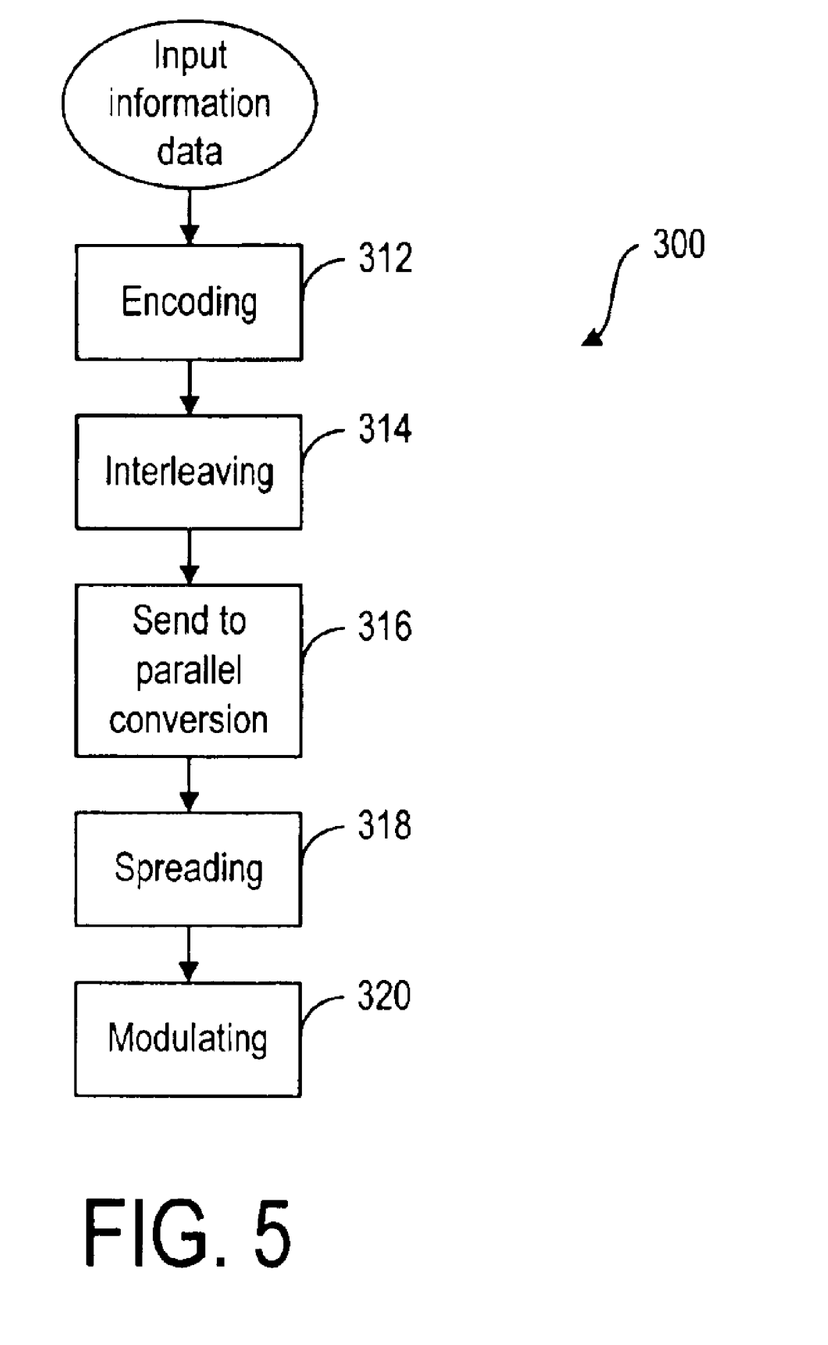
FIG. 5 is a flowchart illustrating the method of processing information data for transmission, according to the present invention.

FIG. 5 summaries the orthogonalized spatial multiplexing method. As shown in the flowchart 300, input information data 110 is encoded at step 312, depending on OSM-1 or OSM-2. According to the OSM-1 method, information data 110 is encoded into binary outputs 112 and interleaved at step 314 into an interleaved data stream 114. At step 316, the interleaved data are separated into a plurality of parallel substreams $116_1, \ldots$, each of which is spreaded with a delayed version of the same spreading code 180 at step 318. After spreading, signals $118_1, \ldots$ are modulated at step 320 into modulated signals $120_1, \ldots$ for transmission. According to the OSM-2 method, information data 110 is encoded into a pair of complexed modulated substream symbols $213_1, 213_2$ and interleaved at step 314 into pairwise interleaved data streams $215_1, 215_2$. At step 316, the pairwise interleaved data streams are separated into a plurality of pairwise substreams $(217_1, 217_2) \ldots$, each of the pairs is spreaded with a delayed version of the same spreading code 180 at step 318. After spreading, signals $218_1, \ldots$ are modulated at step 320 into modulated signals $220_1, \ldots$ for transmission.

Performance Comparison

Figure 6:
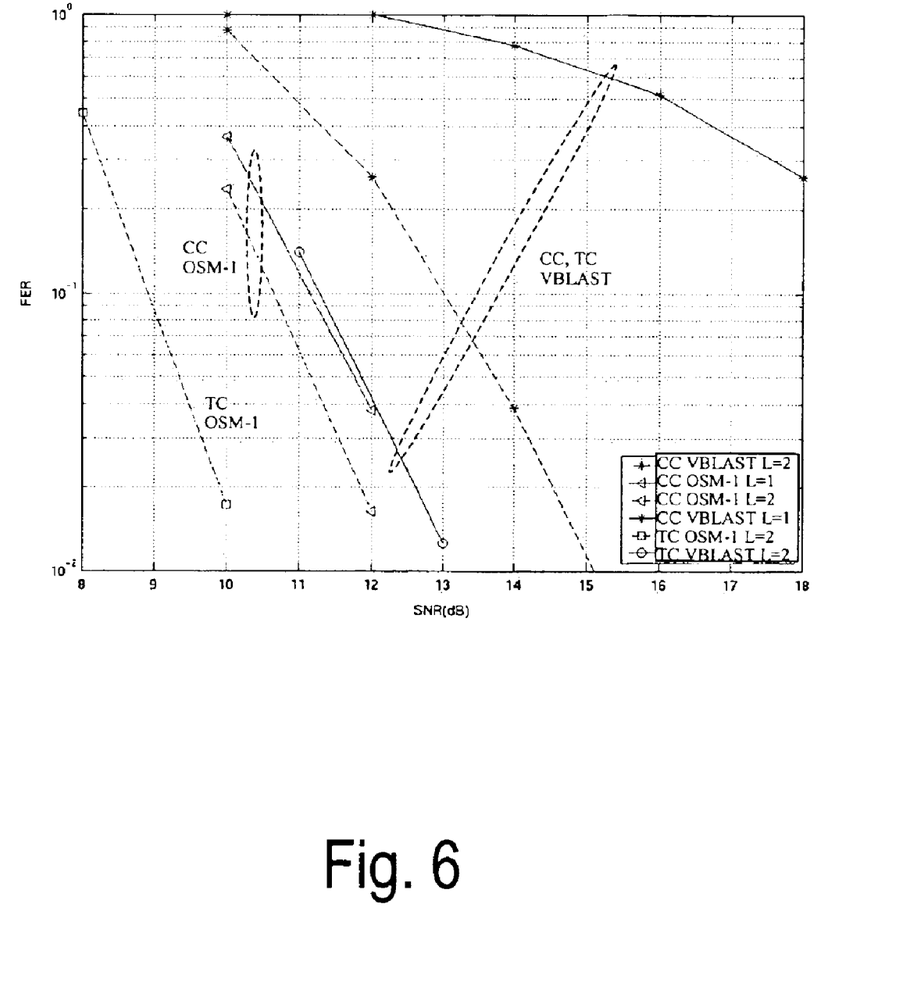
FIG. 6 is a chart showing the performance of the CC and TC Vertically coded VBLAST method as compared to the corresponding OSM-1 method, according to the present invention, wherein the comparison is made with (4,4) system, single user case, 250 transmissions per layer, one and two equal power multipaths, quasi-static fading, un-correlated antennas.
Figure 7:
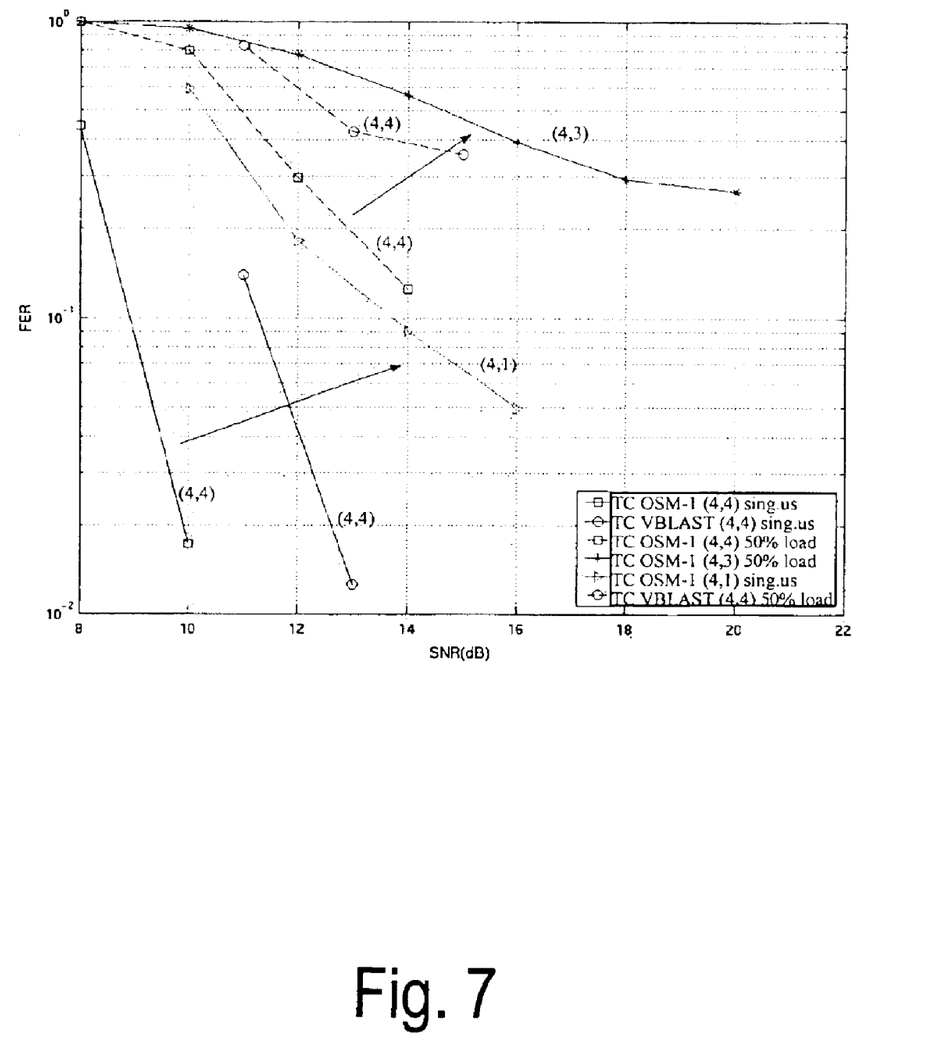
FIG. 7 is a chart showing the performance of the TC Vertically coded VBLAST method as compared to the TC coded OSM-1 method, according to the present invention, wherein the comparison is made with single user and 50% load cases, 250 transmissions per layer, two equal power multipaths, quasi-static fading, uncorrelated antennas.

The performance of the Convolutionally (CC) and Turbo (TC) vertically-coded VLBAST method has been compared to that of the OSM-1, according the present invention, for the single user case in single (L=1) and two (L=2) path equal power channel with four transmit and four receive antennas (4,4). For the case of two equal power multipaths (L=2), the slopes of the curves are the same, though TC coded OSM-1, as compared to TC coded VBLAST, offers around 2.5 dB gain at FER of $10^{-1}$, as shown in FIG. 6. In FIG. 7, the TC vertically-coded VBLAST and OSM-1 are compared in the single user case and in the 50% loaded system. In the (4,4) case, OSM-1 strongly outperforms VLBAST, which in the 50% loaded case could not even reach the typically required FER for ARQ of $10^{-1}$.

Figure 8:
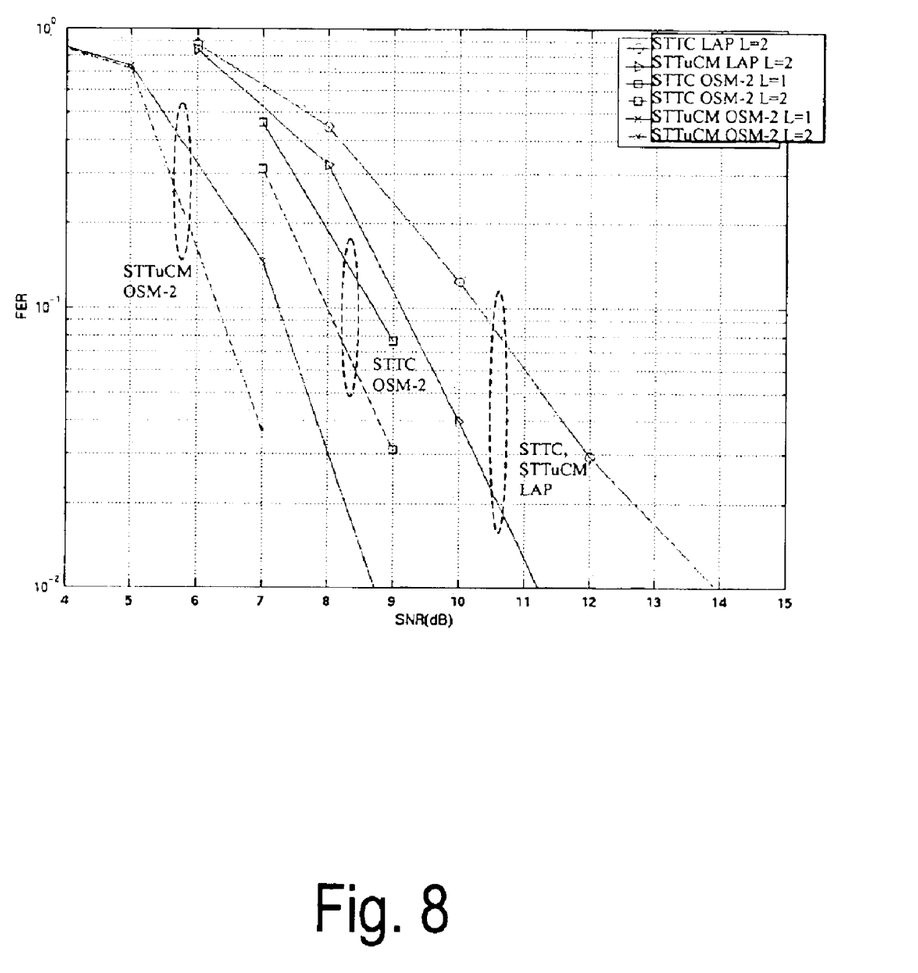
FIG. 8 is a chart showing the performance of the STTC and STTuCM Vertically coded LAP method as compared to the corresponding OSM-2 method, according to the present invention, wherein the comparison is made with single user case, 130 transmissions per layer, one and two equal power multipaths, quasi-static fading, uncorrelated antennas.
Figure 9:
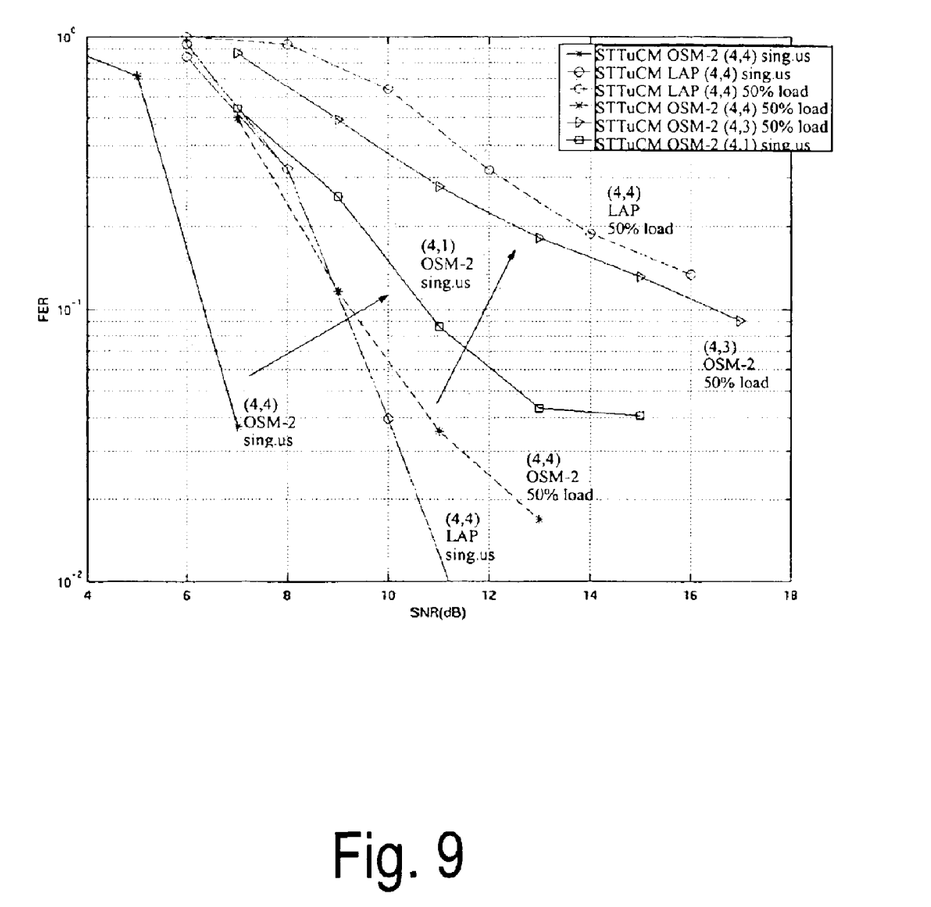
FIG. 9 is a chart showing the performance of another STTuCM Vertically coded LAP method as compared to the corresponding OSM-2 method, according to the present invention, wherein the comparison is made with single user and 50% load cases, 130 transmissions per layer, two equal power multipaths, quasi-static fading, uncorrelated antennas.

The performance of a Vertically 32-state STTC and 2×8 state STTuCM-coded generalized BLAST (a linear array processing LAP) has been compared to the performance of OSM-2 in single (L=1) and two (L=2) path equal power channels in the (4,4) system, as shown in FIG. 8. STC-coded OSM-2 strongly outperforms vertically STC-coded LAP. When L=2 at FER=$10^{-1}$, STTuCM-coded OSM-2 outperforms STTC-coded OSM-2, Vertically STTuCM-coded LAP and Vertically STTC-coded LAP by more than 1.5 dB, more than 2.5 dB and around 4 dB, respectively. In FIG. 9, STTuCM-coded LAP and OSM-2 are compared in the single user and 50% loaded systems with L=2. In the multiuser case, the OSM-2 with (4,3) outperforms the LAP with (4,4) by more than 1 dB at FER=$10^{-1}$. When both schemes use the same number of antennas (4,4) the performance gain of STTuCM-coded OSM-2, as compared to Vertically STTuCM-coded LAP, is more than 8 dB.

The OSM-1 scheme is more pragmatic than OSM-2 in that OSM-1 can be readily used with the existing 3GPP standardized codex (CC and TC). However, with the STTuCM with OSM-2 scheme, the performance of a WCDMA system can be farther dramatically improved.

Figure 10:
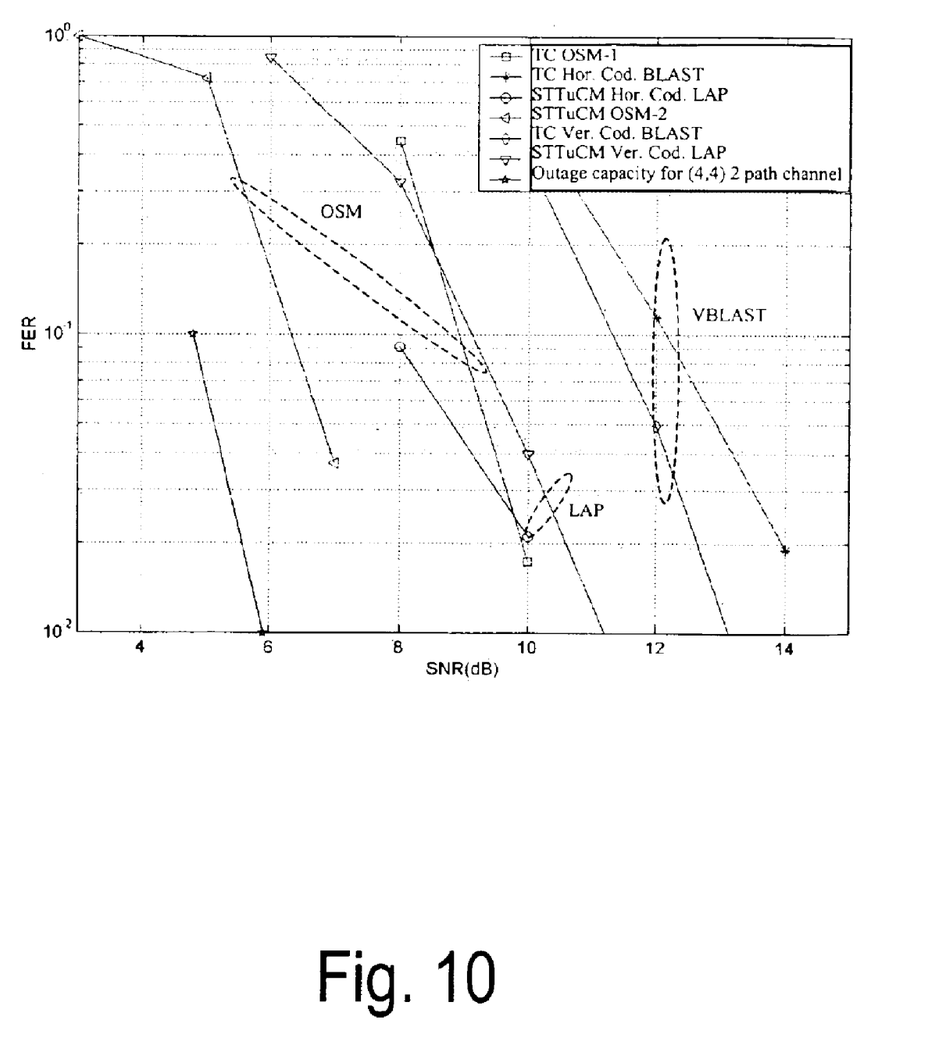
FIG. 10 is a chart showing the performance of Horizontally and Vertically TC coded VBLAST, Horizontal and Vertically STTuCM coded LAP, and TC and STTuCM OSM-1 and OSM-2, wherein the comparison is made with single user, (4,4), two path equal power channel, quasi-static fading, uncorrelated antennas.
Figure 11:
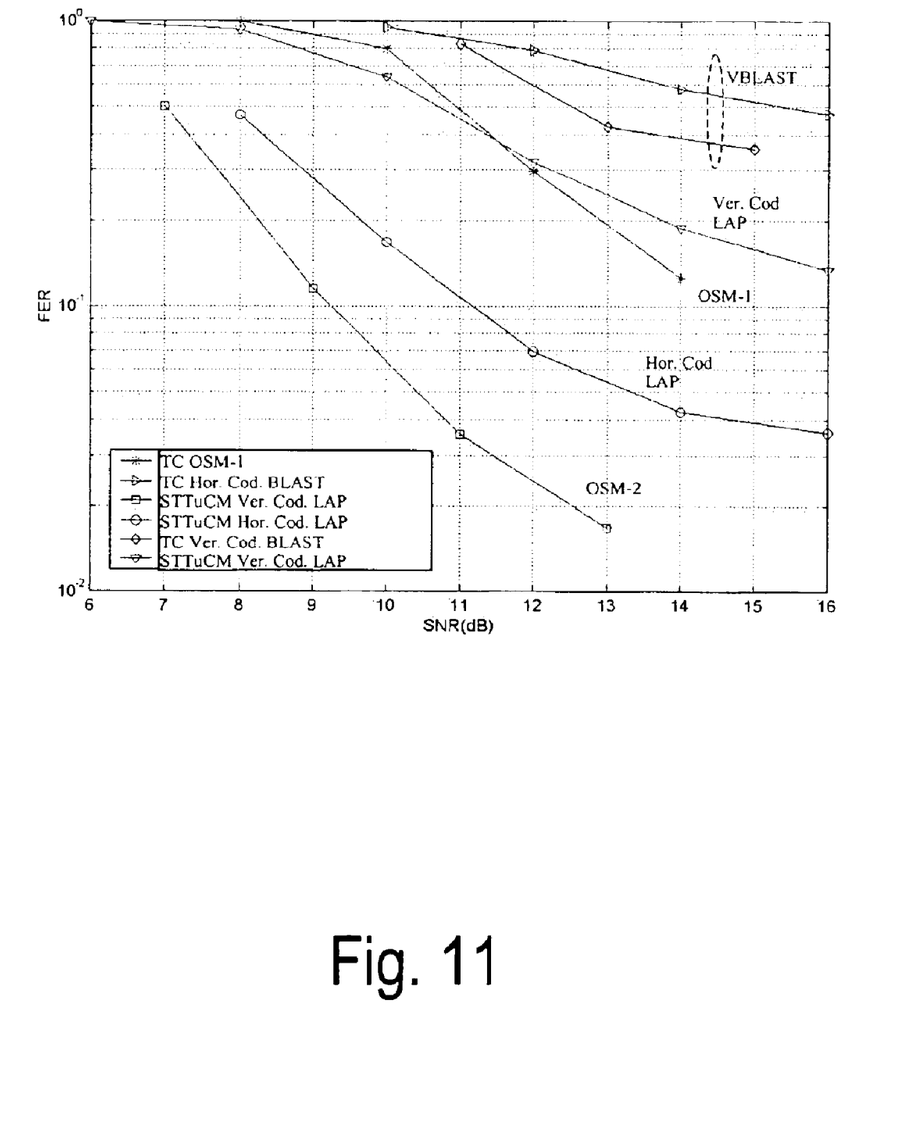
FIG. 11 is a chart showing the performance of VBLAST, LAP, OSM-1 and OSM-2, wherein the comparison is made with 50% load, (4,4), two path equal power channel, quasi-static fading, uncorrelated antennas.

In FIGS. 10 and 11, the performance of OSM-1 and OSM-2 are summarized in the single user and 50% loaded case, respectively, with (4,4) and L=2. The performance of Horizontally TC-coded VBLAST and Horizontally STTuCM-coded LAP were also added for comparison. In FIG. 10, the outage capacity of (4,4) channel with two equal power multipaths was also depicted. STTuCM coded OSM-2 outperforms all considered schemes, performing within 1.5 dB away from 10% outage capacity. TC coded OSM-1 outperforms both Vertically and Horizontally TC coded VBLAST in the both single user case and 50% loaded system.

The main advantages of the present invention are the significant performance improvement and considerable complexity reduction as compared to current 3GPP proposals. The combination of serial-to-parallel conversion and the orthogonalized transmission from different uncorrelated transmit antennas act as a unique spatial interleaving, which averages the SNR over the transmission layers. The powerful channel coding (TC and STTuCM) employed in conjunction with the OSM benefits from the spatial interleaving in the low mobility applications producing the large coding gains. Increasing the number of layers, i.e., transmit antennas, the equivalent depth of the spatial interleaving is increased, i.e., better SNR averaging is achieved. Therefore, along with the increased throughput, one would also expect better performance in terms of power efficiency as the number of transmit antennas increases. However, increasing the number of transmit antennas increases the interference in the system, so the eventual performance improvement in power efficiency is invested to compensate for the increased interference at the receiver. However, the performance results show that good performance can be achieved with the simple matched filter based receiver and with the limited number of receive antennas.

The number of receive antennas could possibly be further decreased by investing some complexity in the more advanced receivers.

The present invention can be readily implemented to dramatically improve the link level throughput and system capacity of the future WCDMA multi-antenna wireless communication systems. It can be used for downlink (base-to-mobile) communications, as future trends are predicting two antennas in mobile handsets, which, in combination with the polarization diversity, may provide an equivalent array with four receive antennas. The scheme can be readily implemented for low constraint delay services (voice transmission) as it has a superior performance already on extremely short frame sizes. In case of delay non-constraint services (data transmission) larger frame sizes are usually used, which additionally improves the performance of the new scheme due to the implemented encoders. The combination with power control over -different layers is one of the interesting topics for possible further performance improvement.

In summary, the combination of serial-to-parallel conversion and the orthogonalized transmission from different uncorrelated transmit antennas acts as a unique spatial interleaving which averages the SNR over the transmission layers. The powerful channel coding (TC and STTuCM) employed in conjunction with the orthogonalized spatial multiplexing benefits from the spatial interleaving in the lower mobility applications producing the large coding gains and high throughputs. The method, according to the present invention, preserves the allocated number of spreading codes and enables a simple detection with the use of matched filtering, i.e., RAKE receiver. Since the signals are separated already at the transmitter, there are no restrictions in the terms of the minimum required number of receiver antennas. The diversity level of the system is equal to the number of employed receive antennas.

The present invention has been disclosed in conjunction with orthogonalized spatial multiplexing with the resolution of one (OSM-1) and with the resolution of two (OSM-2). It should be noted that the present invention can also be applied to orthogonalized spatial multiplexing with the resolution of N (OSM-N), with N>2, by grouping N antennas of the transmitter and applying different delayed versions of the spreading code to different groups of antennas. In a transmitter with n antennas, there will be n/N of such groups. Similar to the transmitter as shown in FIG. 3, the transmitter for OSM-N comprises an STC encoder for encoding the information data stream into a group of N complex modulated substream symbols $213_1, \ldots, 213_N$. These substream symbols are then interleaved by N interleavers and converted by a serial-to-parallel converter into n/N groups of substreams for spreading.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of processing information data in a wireless communications system having a plurality of transmit antennas for transmission, wherein the method comprises:

encoding the information data for providing encoded data;

spreading the encoded data with a spreading code for providing a first spread data stream;

spreading the encoded data with at least one delayed version of the spreading code for providing at least one second spread data stream;

modulating the first and second spread data streams for providing modulated signals; and conveying the modulated signals to the transmit antennas for transmission, said method characterized by separating the encoded data into data sub-streams prior to said spreading, the data sub-streams including at least a first group of encoded data and a second group of encoded data such that the first spread data stream is indicative of the first group of encoded data and said at least one second spread data stream is indicative of the second group of encoded data, wherein the encoded data comprises a pair of mutually orthogonal substream symbols, said method further characterized in that the data sub-streams comprise at least a first pairwise substream and a second pairwise substream of the substream symbol pair, such that the first group of encoded data comprises the first pairwise substreams and the second group of encoded data comprises the second pairwise substreams.

2. A method of processing information data in a wireless communications system having a plurality of transmit antennas for transmission, wherein the method comprises:

encoding the information data for providing encoded data;

spreading the encoded data with a spreading code for providing a first spread data stream;

spreading the encoded data with at least one delayed version of the spreading code for providing at least one second spread data stream;

modulating the first and second spread data streams for providing modulated signals; and conveying the modulated signals to the transmit antennas for transmission, said method characterized by separating the encoded data into data sub-streams prior to said spreading, the data sub-streams including at least a first group of encoded data and a second group of encoded data such that the first spread data stream is indicative of the first group of encoded data and said at least one second spread data stream is indicative of the second group of encoded data, wherein the encoded data comprises a group of N mutually orthogonal substream symbols, with N being a positive integer greater than 2, said method further characterized in that the data substreams comprise at least a first group of N substreams and a second group of N substreams of the substream symbols, such that the first group of encoded data comprises the first group of N substreams and the second group of encoded data comprises the second group of N substreams.

3. A transmitter for processing information data for providing modulated signals for transmission via a plurality of transmit antennas, wherein the transmitter comprises:

means, responsive to the information data, for providing encoded data;

means for spreading the encoded data with a spreading code for providing a first spread data stream, and for spreading the encoded data with at least one delayed version of the spreading code for providing at least one second spread data stream; and means for modulating the first and second spread data streams for providing the modulated signals, characterized by means, responsive to the encoded data, for separating the encoded data into data sub-streams prior to the spreading of the encoded data by the spreading mean the data sub-streams including at least a first group of encoded data and a second group of encoded data such that the first spread data stream is indicative of the first group of encoded data and said at least one second spread data stream is indicative of the second group of encoded data, wherein the encoded data comprises a pair of mutually orthogonal substream symbols, said transmitter further characterized in that the data substreams comprise at least a first pairwise substream and a second pairwise substream of the substream symbol pair, such that the first group of encoded data comprises the first pairwise substreams and the second group of encoded data comprises the second pairwise substreams.

4. A transmitter for processing information data for providing modulated signals for transmission via a plurality of transmit antennas, wherein the transmitter comprises:

means, responsive to the information data, for providing encoded data;

means for spreading the encoded data with a spreading code for providing a first spread data stream, and for spreading the encoded data with at least one delayed version of the spreading code for providing at least one second spread data stream; and means for modulating the first and second spread data streams for providing the modulated signals, characterized by means, responsive to the encoded data, for separating the encoded data into data sub-streams prior to the spreading of the encoded data by the spreading means, the data sub-streams including at least a first group of encoded data and a second group of encoded data such that the first spread data stream is indicative of the first group of encoded data and said at least one second spread data stream is indicative of the second group of encoded data, wherein the encoded data comprises a group of N mutually orthogonal substream symbols, with N being a positive integer greater than 2, said transmitter further characterized in that the data substreams comprise at least a first group of N substreams and a second group of N substreams of the substream symbols, such that the first group of encoded data comprises the first group of N substreams and the second group of encoded data comprises the second group of N substreams.

5. A wireless communications system comprising a transmitter and a receiver, the transmitter having a plurality of transmit antennas for transmitting modulated signals indicative of information data and the receiver having a plurality of receive antennas for receiving modulated signals, wherein the transmitter comprises:

means, responsive to the information data, for providing encoded data;

means for spreading the encoded data with a spreading code for providing a first spread data stream, and for spreading the encoded data with at least one delayed version of the spreading code for providing at least one second spread data stream; and means for modulating the first and second spread data streams for providing the modulated signals, characterized by:

means, responsive to the encoded data, for separating the encoded data into data sub-streams, prior to the spreading of the encoded data by the spreading means, the data sub-streams including at least a first group of encoded data and a second group of encoded data such that the first spread data stream is indicative of the first group of encoded data and said at least one second spread data stream is indicative of the second group of encoded data, wherein the encoded data comprises a pair of mutually orthogonal substream symbols, said system further characterized in that the data sub-streams comprise at least a first pairwise substream and a second pairwise substream of the substream symbol pair, such that the first group of encoded data comprises the first pairwise substreams and the second group of encoded data comprises the second pairwise substreams.

* * * * *